United States Patent [19]
Bedard et al.

[11] Patent Number: 5,122,357
[45] Date of Patent: Jun. 16, 1992

[54] CRYSTALLINE MICROPOROUS METAL OXYSULFIDE COMPOSITIONS

[75] Inventors: Robert L. Bedard, Fishkill; Edith M. Flanigen, White Plains; Stephen T. Wilson, Shrub Oak, all of N.Y.

[73] Assignee: UOP, Des Plaines, Ill.

[21] Appl. No.: 670,826

[22] Filed: Mar. 18, 1991

[51] Int. Cl.⁵ .............................................. C01B 17/98
[52] U.S. Cl. .................................... 423/518; 502/216; 502/219; 502/222; 585/467; 585/480; 585/481; 585/486; 585/734; 585/752; 210/767; 55/75
[58] Field of Search ..................... 502/216, 219, 222; 423/518

[56] References Cited

U.S. PATENT DOCUMENTS

| | | | |
|---|---|---|---|
| 2,780,854 | 2/1957 | Doumari | 502/222 |
| 3,847,835 | 5/1973 | Cosyns | 502/221 |
| 4,061,724 | 12/1977 | Grose et al. | 423/335 |
| 4,310,440 | 1/1982 | Wilson et al. | 252/435 |
| 4,398,926 | 8/1983 | Doshi | 55/16 |
| 4,440,871 | 4/1984 | Lok et al. | 502/214 |
| 4,500,651 | 2/1985 | Lok et al. | 502/208 |
| 4,567,029 | 1/1986 | Wilson et al. | 423/306 |
| 4,589,888 | 5/1986 | Hiscock et al. | 55/26 |
| 4,686,093 | 8/1987 | Flanigen et al. | 423/306 |
| 4,723,966 | 2/1988 | Fuderer | 55/26 |
| 4,738,837 | 4/1988 | Flanigen et al. | 423/306 |
| 4,741,892 | 5/1988 | Lok et al. | 423/306 |
| 4,744,970 | 5/1988 | Lok et al. | 423/306 |
| 4,793,984 | 12/1988 | Lok et al. | |
| 4,793,984 | 12/1988 | Lok et al. | 423/305 |
| 4,799,942 | 1/1989 | Wilson et al. | 55/35 |
| 4,800,761 | 11/1989 | Bedard et al. | 502/215 |
| 4,853,197 | 8/1989 | Wilson et al. | 423/306 |
| 4,888,167 | 4/1987 | Flanigen et al. | 423/306 |
| 4,892,720 | 1/1990 | Skeels et al. | 423/328 |

FOREIGN PATENT DOCUMENTS 0049754  11/1964  Poland ................. 502/216

OTHER PUBLICATIONS

Klemperer & Schwartz, "Synthesis and Characterization of the Polyoxothioanions $TaW_5O_{18}S^{3-}$ and $NbW_5O18S^{3-}$", Inorganic Chemistry, 24, 4459-61 (1985).
J. Am. Chem. Soc., 195-208 (1959).
Zeit. Kristallographie, 172, 167-174 (1985).
D. W. Breck, Zeolite Molecular Sieves, John Wiley & Sons (1974), p. 636.

Primary Examiner—Asok Pal
Assistant Examiner—P. Achutamurthy
Attorney, Agent, or Firm—Thomas K. McBride; Eugene I. Snyder; Frank S. Molinaro

[57] ABSTRACT

This invention deals with a crystalline oxysulfide composition, a process for preparing the composition, a catalyst using the composition and processes using the composition. The crystalline oxysulfide composition has a three-dimensional microporous framework structure of at least $MO_2$, $MS_2$, and MOS tetrahedral units, having an intracrystalline pore system and an empirical formula expressed in molar ratios:

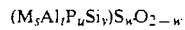

$$(M_sAl_tP_uSi_v)S_wO_{2-w}$$

where M is at least one metal selected from the group consisting of metals which: 1) can be incorporated into the framework structure of a microporous molecular sieve and 2) form hydrolytically stable sulfides; s, t, u, v and w are the mole fractions of M, Al, P, Si and S respectively. The oxysulfide composition is prepared by contacting a molecular sieve having an empirical formula: $(M_sAl_tP_uSi_v)O_2$ with a sulfur containing compound such as carbonyl sulfide for a time and a temperature sufficient to sulfide a fraction of the metal. The oxysulfide compositions are useful as catalyst in hydrocarbon conversion processes such as cracking.

13 Claims, No Drawings

1

CRYSTALLINE MICROPOROUS METAL OXYSULFIDE COMPOSITIONS

BACKGROUND OF THE INVENTION

Molecular sieves of the crystalline aluminosilicate zeolite type are well known in the art and now comprise over 150 species of both naturally occurring and synthetic compositions. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic but which exhibit the ion-exchange and/or adsorption characteristics of the zeolites. These include: 1) a pure silica polymorph, silicalite, having a neutral framework containing neither cations nor cation sites as disclosed in U.S. Pat. No. 4,061,724; 2) crystalline aluminophosphate compositions disclosed in U.S. Pat. No. 4,310,440; 3) silicon substituted aluminophosphates as disclosed in U.S. Pat. No. 4,440,871; 4) titanium substituted aluminophosphates as disclosed in U.S. Pat. No. 4,500,651; 5) metal substituted aluminumphosphorus-silicon-oxide molecular sieves as disclosed in U.S. Pat. No. 4,793,984; and 6) metal substituted aluminophosphates as disclosed in U.S. Pat. No. 4,567,029. Finally, U.S. Pat. No. 4,880,761 discloses crystalline metal sulfide and metal selenide microporous materials.

The materials described above are based on either the oxide or the sulfide of the metal. For several reasons, it would be desirable to synthesize crystalline microporous materials containing framework units of $MO_2$, MOS and $MS_2$. The combination of sulfur and oxygen in the same molecular sieve should lead to materials with novel catalytic and adsorption properties. The reason for this is that the more acidic nature of the —SH moiety versus the —OH moiety modifies the acid activity of the metal oxysulfide and affects the distribution of acid sites within the microporous material. The modified surface selectivity of an oxysulfide microporous material would affect product distribution of hydrocarbon conversion reactions.

Klemperer and Schwartz, "Synthesis and Characterization of the Polyoxothioanions $TaW_5O_{18}S^{3-}$ and $NbW_5O_{18}S^{3-}$", Inorganic Chemistry, 24, 4459-61 (1985), disclose that some of the oxygen atoms in polyoxoanions can be replaced by sulfur atoms without metal center reduction and/or metal-oxygen framework degradation by treating polyoxoanions such as $Nb_2W_4O_{19}{}^{4-}$ with hexamethyldisilthiane. However, there is no hint in Klemperer and Schwartz that some of the oxygens in molecular sieves could be replaced by sulfur. Indeed, Klemperer and Schwartz indicate that their niobium and tantalum oxothio compounds were the first such compounds to be isolated.

In contrast to the polyoxothioanions of Klemperer and Schwartz, applicants have prepared molecular sieves in which some of the oxygen atoms in the framework have been replaced with sulfur, thereby forming an oxysulfide composition. For example, applicants have taken a CoAPO-5 molecular sieve (calcined form), reacted it with hexamethyldisilthiane (HMDT) and obtained a product which had the same crystallinity as the starting material and in which about 5% of the cobalt atoms were sulfided. This material has shown activity for cracking hydrocarbons and for adsorbing various molecular species.

Applicants have prepared a wide variety of compositions which are represented by the empirical formula:

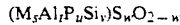

$(M_sAl_tP_uSi_v)S_wO_{2-w}$ where M is at least one metal selected from the group consisting of metals which: 1) can be incorporated into the framework structure of a microporous molecular sieve and 2) form hydrolytically stable sulfides; s is the mole fraction of M and varies from greater than zero to about 1, t is the mole fraction of Al and varies from 0 to less than 0.5, u is the mole fraction of P and varies from 0 to about 0.5, v is the mole fraction of Si and varies from 0 to less than 0.5, w is the mole fraction of S and varies from greater than zero to about 2s. Additionally, t, u and v are chosen such that when t is greater than zero u is greater than zero and $s+t+u+v=1$.

SUMMARY OF THE INVENTION

This invention relates to a crystalline oxysulfide composition, a process for preparing the composition, a catalyst using the composition and processes using the composition. Accordingly, one embodiment of the invention is a crystalline oxysulfide composition having a three-dimensional microporous framework structure of at least $MS_2$, $MO_2$, and MOS tetrahedral units, having an intracrystalline pore system and an empirical formula expressed in molar ratios:

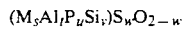

$(M_sAl_tP_uSi_v)S_wO_{2-w}$ where M is at least one metal selected from the group consisting of metals which: 1) can be incorporated into the framework structure of a microporous molecular sieve and 2) form hydrolytically stable sulfides; s is the mole fraction of M and varies from greater than zero to about 1, t is the mole fraction of Al and varies from 0 to less than 0.5, u is the mole fraction of P and varies from 0 to about 0.5, v is the mole fraction of Si and varies from 0 to less than 0.5, w is the mole fraction of S and varies from greater than zero to about 2s and t, u and v are chosen such that when t is greater than zero u is greater than zero and $s+t+u+v=1$.

Another embodiment of the invention is a process for preparing the crystalline oxysulfide composition described above. The process comprises contacting a molecular sieve having an empirical formula

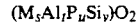

$(M_sAl_tP_uSi_v)O_2$ with a sulfur containing compound at a temperature and for a time sufficient to exchange a portion of the oxygen on the $MO_2$ units of the framework structure with sulfur, thereby forming $MS_2$ and MOS framework units and providing a crystalline composition having the empirical formula:

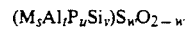

$(M_sAl_tP_uSi_v)S_wO_{2-w}$

Yet another embodiment of the invention is a process for converting a hydrocarbon feed to a hydrocarbon converted product comprising contacting the hydrocarbon feed under hydrocarbon converting conditions with the crystalline oxysulfide composition described above.

Still another embodiment of the invention is a process for separating a mixture of molecular species having different kinetic diameters comprising contacting the mixture with the crystalline oxysulfide composition described above, the crystalline oxysulfide composition having pore diameters large enough to adsorb at least one but not all the molecular species of the mixture, the crystalline oxysulfide composition being at least partially activated, whereby at least some molecules of the molecular species whose kinetic diameters are sufficiently small can enter the intracrystalline pore system of the crystalline oxysulfide composition.

A further embodiment of the invention is a process for separating a mixture of molecular species having different degrees of polarity comprising contacting the mixture with the crystalline oxysulfide composition described above, the crystalline composition having pore diameters large enough to adsorb at least one but not all the molecular species of the mixture, the crystalline composition being at least partially activated, whereby at least some molecules of the molecular species whose kinetic diameters are sufficiently small can enter the intracrystalline pore system of the crystalline composition.

Other objects and embodiments will become more apparent after a more detailed description of the invention.

DETAILED DESCRIPTION OF THE INVENTION

As stated, the instant invention relates to a crystalline oxysulfide composition having a three-dimensional microporous structure, a method of preparing the crystalline compositions and methods of using the crystalline compositions. The crystalline oxysulfide compositions of the instant invention have the empirical formula expressed in molar ratios:

$$(M_sAl_tP_uSi_v)S_wO_{2-w}$$

where M is at least one metal selected from the group consisting of metals which: 1) can be incorporated into the framework structure of a microporous molecular sieve and 2) form hydrolytically stable sulfides; s is the mole fraction of M and varies from greater than zero to about 1, t is the mole fraction of Al and varies from 0 to less than 0.5, u is the mole fraction of P and varies from 0 to about 0.5, v is the mole fraction of Si and varies from 0 to less than 0.5, w is the mole fraction of S and varies from greater than zero to about 2s. Additionally, t, u and v are chosen such that when t is greater than zero, u is greater than zero, and the mole fractions of s, t, u and v are normalized such that $s+t+u+v=1$. The compositions are characterized in that they have an intracrystalline pore system and have a three-dimensional microporous framework structure of at least $MS_2$, $MO_2$ and MOS tetrahedral units. That is, when $s=1$, the composition will only be made up of $MS_2$, $MO_2$ and MOS tetrahedral units. However, when t, u or v are greater than zero, the composition will be made up of one or more of $AlO_2$, $PO_2$ and $SiO_2$ tetrahedral units in addition to the $MS_2$, $MO_2$ and MOS tetrahedral units.

As stated, the metals (M) which can be used are any of those which are well known to substitute into the framework structure of molecular sieves. These metals are described in the following patents which are incorporated by reference: U.S. Pat. Nos. 4,853,197; 4,888,167; 4,738,837; 4,799,942; 4,793,984; 4,741,892; 4,686,093 and 4,567,029. Another criterion which the above metals must meet is that they form hydrolytically stable sulfides. By hydrolytically stable is meant that the metal sulfide moiety which is formed does not react with ambient moisture to form $H_2S$ and a metal oxide. Illustrative examples of these metals are cobalt, tin, zinc, manganese, iron, chromium, arsenic, gallium, germanium, and vanadium. Preferred metals are cobalt, zinc, tin, iron, chromium, manganese, arsenic, gallium and germanium.

The crystalline oxysulfide compositions of this invention are prepared by reacting a metal substituted molecular sieve with a sulfur containing compound. The molecular sieves which can be used in the preparation of compositions of this invention are any of the molecular sieves which have the empirical formula $(M_sAl_tP_uSi_v)O_2$ where M, s, t, u and v are defined as above. When v is zero and t and u are greater than zero, the molecular sieves are metallo-alumino-phosphate molecular sieves, whose synthesis is described in U.S. Pat. Nos. 4,853,197; 4,567,029 and 4,686,093, which patents are incorporated by reference. In the special case when $s=1$ and t, u and $v=0$, the metal M is a combination of gallium and germanium. Such compositions have been described in the art. See J. Chem. Soc., 195–208 (1959) and Zeit. Kristallographie, 172, 167–174 (1985) which are incorporated by reference. Finally, a wide variety of metal substituted aluminum-phosphorus-silicon oxide molecular sieves can be used. These types of materials are disclosed, for example, in U.S. Pat. Nos. 4,793,984, 4,741,892 and 4,744,970 which are incorporated by reference.

The molecular sieve which contains at least one of the metals which fit the above criteria is contacted with a sulfur containing compound, thereby exchanging some of the oxygen on the $MO_2$ tetrahedral units with sulfur to give $MS_2$ and MOS tetrahedral units. It is necessary that the molecular product of the S-O exchange must be substantially more thermodynamically stable than the sulfiding agent. Examples of sulfiding agents which can produce such products and thus can be used in the instant process are hexamethyldisilthiane (HMDT), carbonyl sulfide (COS), carbon disulfide ($CS_2$), and hydrogen sulfide ($H_2S$) with HMDT and COS being preferred. The products that are obtained from these sulfiding agents are: carbon dioxide from COS and $CS_2$, hexamethyldisiloxane from HMDT and water from $H_2S$.

The process of preparing the oxysulfide crystalline compositions of this invention involves contacting the desired molecular sieve with the sulfur containing compound. If the molecular sieve was prepared using a templating agent, the templating agent must be removed before sulfiding. This is generally accomplished by calcining the molecular sieve at a temperature of about 400° to about 600° C. until the gray or black color is completely gone. Usually this takes about 1 to about 18 hours. Reaction with the sulfiding agent is now carried out and must be done before any rehydration occurs. If sulfiding is carried out in an apparatus or location other than where the calcination took place, the molecular sieve must be protected from rehydration. This can be done by filling the pores of the molecular sieve with a relatively nonvolatile organic compound such as dimethoxyethane (monoglyme). Once transfer of the molecular sieve is accomplished, the organic compound is removed by heating the molecular sieve under a nitrogen flow to a temperature of about 300° C.

If the sulfur containing compound is a liquid, e.g., HMDT, it is added to a solvent and then this mixture is added to the molecular sieve (usually in the form of a powder). The solvents which may be used are any solvent which will not react with the sulfur containing compound or with the molecular sieve. Illustrative of the solvents which can be used are ethers, aromatic and alkyl hydrocarbons. Specific examples are tetrahydrofuran, monoglyme and toluene. The mixture of molecular sieve and sulfur containing compound is stirred for a period of about 1 hour to about 8 days. Although the reaction can proceed at room temperature, it is preferred to heat the mixture to a temperature from about 60° C. to about reflux. The product is isolated by filtration followed by washing with fresh solvent.

If the sulfur containing compound is a gas, the process is carried out by placing a sample of the molecular sieve to be sulfided in a ceramic boat which in turn is placed into a tube furnace and heated to a temperature of about 200° to about 400° C. Alternatively, the molecular sieve can be packed into a metal or quartz tube which is then heated to a temperature of about 200° C. to about 400° C. Inert materials such as quartz spheres or chips may be added to the powder to minimize pressure drops. Once the sample has reached the desired temperature, the sulfiding gas is flowed through the sample for a time of about 30 minutes to about 2 days. The sulfiding gas may be flowed through the reactor under atmospheric pressure or at above atmospheric pressures. While the sample is being heated up either nitrogen or the sulfiding gas is flowed through the sample. Finally, the sulfiding gas may be flowed through the sample neat or it may be diluted with an inert gas such as nitrogen or helium.

The amount of sulfur which is exchanged depends on the amount of time that the molecular sieve and sulfur containing compound are contacted. Although all the oxygen can be replaced by sulfur it is desirable to replace only a fraction of the oxygen. Generally the metal is sulfided (oxygen replaced by sulfur) from about 5 to about 50%, which means that from about 5 to about 50% mole fraction of the metal has at least one sulfur coordinated to it.

The resultant products have been tested to verify that the sulfur has entered the framework and is coordinated to the metal or metals present in the framework. For example, it has been observed that the sulfided composition has the same X-ray pattern as the starting molecular sieve. ESCA analysis shows that the metal was not leached out by the sulfiding process and that sulfiding took place in the vicinity of the metal. Finally, the cracking activity of the sulfided composition was considerably different from that of the starting molecular sieve which difference is attributable to metal sulfide active sites.

The crystalline microporous oxysulfide compositions of the present invention are useful as catalysts or catalyst supports in any of several hydrocarbon conversion processes. If it is desired to deposit catalytic metals onto the instant compositions, the composition can be impregnated or otherwise loaded with catalytically active metals by methods well known in the art (e.g., ion exchange or impregnation) and used, for example, in fabricating catalyst compositions having silica or alumina bases. Illustrative of the hydrocarbon conversion processes which the instant compositions (with or without additional catalytic metals) catalyze are: cracking, hydrocracking, alkylation of aromatics or isoparaffin, isomerization including xylene isomerization, polymerization, reforming, hydrogenation, dehydrogenation transalkylation, dealkylation, hydrofining, hydroisomerization, hydrodecyclization and dehydrocyclization. The product derived from any of these processes is generally referred to as a hydrocarbon converted product.

Specific conditions for the above-named reactions are well known in the art and generally depend on the type of hydrocarbon to be converted. Thus, the instant compositions which may contain a hydrogenation promoter such as platinum or palladium can be used to hydrocrack heavy petroleum residual stocks, cyclic stocks and other hydrocrackable charge stocks at temperature in the range of 400° F. to 825° F. (204° C. to 441° C.) using molar ratios of hydrogen to hydrocarbon in the range of between 2 and 80, pressures between 10 and 3500 psig (0.171 to 24.23 MPa), and a liquid hourly space velocity (LHSV) of from 0.1 to 20, preferably 1.0 to 10.

The catalyst compositions employed in hydrocracking are also suitable for use in reforming processes in which the hydrocarbon feedstocks contact the catalyst at temperatures of from about 700° F. to 1000° F. (371° C. to 538° C.), hydrogen pressure of from 100 to 500 psig (0.791 to 3.448 MPa), LHSV values in the range of 0.1 to 10 and hydrogen to hydrocarbon molar ratios in the range of 1 to 20, preferably between 4 and 12.

Catalytic cracking processes are preferably carried out with one instant composition using feedstocks such as gas oils, heavy naphthas, deasphalted crude oil residua, etc., with gasoline being the principal desired product. Temperature conditions of 850° to 1100° F. (454° tp 593° C.), LHSV values of 0.5 to 10 and pressure conditions of from about 0 to 50 psig (101 to 446 kPa) are suitable.

Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalytic cracking. For these reactions, it is preferred to use the instant compositions in conjunction with a Group VIII non-noble metal cation such as cobalt and nickel.

In catalytic dealkylation wherein it is desired to cleave paraffinic side chains from aromatic nuclei without substantially hydrogenating the ring structure, relatively high temperatures in the range of about 800°-1000° F. (427°-538° C.) are employed at moderate hydrogen pressures of about 300-1000 psig (2.17-6.895 MPa), other conditions being similar to those described above for catalytic hydrocracking. Preferred catalysts are of the same type described above in connection with catalytic dehydrocyclization. Particularly desirable dealkylation reactions contemplated herein include the conversion of methylnaphthalene to naphthalene and toluene and/or xylenes to benzene.

Isomerization reactions are carried out under conditions similar to those described above for reforming, using somewhat more acidic catalysts. Olefins are preferably isomerized at temperatures of 500°-900° F. (260°-482° C.), while paraffins, naphthenes and alkyl aromatics are isomerized at temperatures of 700°-1000° F. (371°-538° C.). Particularly desirable isomerization reactions contemplated herein include the conversion of n-heptene and/or n-octane to isoheptanes, iso-octanes, butane to iso-butane, methylcyclopentane to cyclodexane, meta-xylene and/or ortho-xylene to paraxylene, 1-butene to 2-butene and/or isobutene, n-hexane to isohexene, cyclohexene to methlcyclopentene, etc. The preferred form of the catalyst is a combination of the instant composition with polyvalent metal compounds (such as sulfides) of metals of Group II-A, Group II-B and rare earth metals. For alkylation and dealkylation processes the instant compositions having pores of at least 5 Å are preferred. When employed for dealkylation of alkyl aromatics, the temperature is usually at least 350° F. (177° C.) and ranges up to a temperature at which substantial cracking of the feedstock or conversion products occurs, generally up to about 700° F. (371° C.). The temperature is preferably at least 450° F. (232° C.) and not greater than the critical temperature of the compound undergoing dealkylation. Pressure conditions are applied to retain at least the aromatic feed in the liquid state. For alkylation the temperature can be as low as 250° F. (121° C.) but is preferably at least 350° F. (177° C.). In the alkylation of benzene, toluene and xylene, the preferred alkylating agents are olefins such as ethylene and propylene.

The catalysts that are useful for hydrogenation, i.e., those containing hydrogenation promoters are also useful in hydroisomerization processes in which feedstocks such as normal paraffins are converted to saturated branched chain isomers. Hydroisomerization is carried out at a temperature of from about 200° F. to 600° F. (93° C. to 316° C.), preferably 300° F. to 550° F. (149° C. to 288° C.) with an LHSV value of from about 0.2 to 1.0. Hydrogen (H) is supplied to the reactor in admixture with the hydrocarbon (Hc) feedstock in molar proportions (H/Hc) of between 1 and 5.

At somewhat higher temperatures, i.e., from about 650° F. to 1000° F. (343° C. to 538° C.), preferably 850° F. to 950° F. (454° C. to 510° C.) and usually at somewhat lower pressures within the range of about 15 to 50 psig (205 to 446 kPa), the same catalyst compositions are used to hydroisomerize normal paraffins. Preferably the paraffin feedstock comprises normal paraffins having a carbon number range of $C_7$-$C_{20}$. Contact time between the feedstock and the catalyst is generally relatively short to avoid undesirable side reactions such as olefin polymerization and paraffin cracking. LHSV values in the range of 0.1 to 10, preferably 1.0 to 6.0 are suitable.

The crystalline materials of this invention are capable of separating mixtures of molecular species based on the molecular size (kinetic diameters) or on the degree of polarity of the molecular species. When the separation of molecular species is based on molecular size, the crystalline microporous material is chosen in view of the dimensions of its pores such that at least the smallest molecular specie of the mixture can enter the intracrystalline void space while at least the largest specie is excluded. The kinetic diameters of various molecules such as oxygen, nitrogen, carbon dioxide, carbon monoxide are provided in D. W. Breck, ZEOLITE MOLECULAR SIEVES, John Wiley and Sons (1974) p. 636. Thus, it is observed from Example 38 herein that TMA-SnS-1can be used to separate carbon monoxide from oxygen (kinetic diameter of 3.46 Å).

When the separation is based on degree of polarity, it is generally the case that the more hydrophilic crystalline material of this invention will preferentially adsorb the more polar molecular species of a mixture having different degrees of polarity even though both molecular species can communicate with the pore system of the crystalline material. For example water, which is more polar, will be preferentially adsorbed over common hydrocarbon molecules such as paraffins, olefins, etc. Thus, the crystalline materials of this invention can be used as desiccants in such adsorption separation/purification processes as natural gas drying, cracked gas drying, etc.

If one of the molecular species, e.g., water, is a small impurity, the separation may be effected in the conventional manner by simply passing the stream to be treated through a bed of the particular crystalline material desired. As the operation of the process continues, there develops in the bed a so-called "front" between the material loaded with the impurity, e.g., water, and the material not so loaded. This front moves through the bed in the direction of gas flow. Before the front reaches the downstream end of the bed, the bed is regenerated by cutting off the flow of feed stream and passing through the bed a purge gas which (usually at a temperature of about 50°-150° C.) desorbs the impurity, e.g., water, from the bed. If the purge gas is adsorbed on the bed, this gas can be removed by passing one or two bed volumes of the feed stream through the bed.

If the concentration of one of the species in the mixture is large, e.g., several percents, other conventional techniques, such as pressure swing adsorption (PSA) and thermal swing adsorption may be used. Such techniques are well known to those skilled in the separation art. See, e.g., U.S. Pat. Nos. 4,723,966, 4,589,888, and 4,398,926. For example, a pressure swing adsorption process will operate at a temperature and pressure sufficient to effect the adsorption and desorption of the component or molecular specie which one wants to remove. Typically the temperature is preferably maintained in the range of about $-50°$ to 100° C. and preferably from about 0° to 50° C. The pressure during adsorption can vary from about 0.2 psia (1.4 kPa) to about 1500 psia (10,342 kPa), preferably from about 50 psia (344 kPa) to about 500 psia (3,447 kPa) and more preferably from about 75 psia (517 kPa) to about 350 psia (2,413 kPa). The pressure during desorption is lower than during adsorption and effective to cause desorption of the adsorbed component. The range of this pressure is from about 0.1 torr (1.3 Pa) to 150 psia (1,034 kPa), preferably from about 0.1 torr (1.3 Pa) to 15 psia (103 kPa) and more preferably from about 0.1 torr (1.3 Pa) to about 250 torr (333 Pa). The cyclic process can comprise additional adsorption and regeneration steps as well as intermediate depressurization and purging steps.

The following examples are presented in illustration of this invention and are not intended as undue limitations on the generally broad scope of the invention as set out in the appended claims.

EXAMPLES 1-6

A series of molecular sieves were sulfided under the following conditions using carbonyl sulfide as the sulfiding agent. The metal containing molecular sieves were synthesized using the procedures outlined in the following U.S. Patents which are incorporated by reference CoAPSO-37,47; MnAPSO-36,44; ZnAPSO-37 were prepared according to U.S. Pat. Nos. 4,793,984 and 4,440,871.

The individual samples of metal-APSO were calcined at 500° C. for 18 hours to remove any residual templating agent. The calcined powder was transferred hot to a nitrogen drybox and dimethoxyethane was added to fill the pores. This mixture was filtered in air to remove excess dimethoxyethane. The filtered powder was mixed with 0.5 mm glass beads, packed into a 3/8" diameter "U" tube. Nitrogen was flowed through the tube while the tube was heated to 300° C. At this time a gas composed of 10% COS/90% $N_2$ was flowed through the tube for 1.5 hours under a pressure of 14 psig and at a flow of 50 cc/min. The results of these experiments are summarized in Table 1.

TABLE 1

Analysis of Oxysulfide Molecular Sieves Prepared using COS

| Example # | Molecular Sieve | Wt % $MO_x$ | Wt % S Added | % of M Sulfided | Crystallinity |
|---|---|---|---|---|---|
| 1 | CoAPSO-37 | 6.01 | 0.79 | 31 | lower |
| 2 | CoAPO-36 | 8.5 | 0.53 | 15 | lower |
| 3 | CoAPSO-47 | 9.21 | 0.85 | 22 | same |
| 4 | MnAPSO-44 | 9.57 | 0.81 | 23 | same |
| 5 | MnAPSO-46 | 6.13 | 0.05 | 3 | same |
| 6 | ZnAPSO-37 | 6.86 | 0.86 | 32 | same |

These data indicate that several types of metal substituted molecular sieves can be sulfided to various degrees using carbonyl sulfide.

EXAMPLE 7

A sample of CoAPSO-47 was calcined at 600° C. for 18 hours, transferred to a nitrogen drybox, mixed with quartz chips and loaded into a 3/8" diameter tube. The tube was heated under nitrogen to a temperature of 370° C. at which time $H_2S$ (100%) was flowed through the tube for 23 hours at a pressure of 30 psig. A total gas volume of 17.6 SCF was flowed over the molecular sieve in the 23 hours.

Analysis of the starting and final product gave the following results: Wt. % $MO_x$=6.84, Wt. % S added=0.95, % of M sulfided=30. The X-ray diffraction of the product showed that 10% of the material had been converted to a tridymite structure type. This may have been due to the steam which was formed during the reaction causing some hydrothermal degradation of the material.

EXAMPLES 8-15

Several samples were sulfided using hexamethyldisilthiane (HMDT) under the following conditions. The starting molecular sieves were calcined at 500°-600° C. for 18 hours. The calcined powders were then transferred in a dry box to round bottom flasks fitted with condensers. All reactions were carried out under a positive nitrogen flow. To the powder there were added various amounts of HMDT in a solvent and the mixture heated for a period of time. A summary of the conditions used for the various experiments is presented in Table 2.

TABLE 2

Experimental Conditions for Sulfiding of Molecular Sieves using HMDT

| Example # | Molecular Sieve | Solvent | Temp (°C.) | Amount HMDT (ml) | Reaction Time |
|---|---|---|---|---|---|
| 8 | MnAPO-5 | THF[1] | 70 | 0.3 | 20 hrs. |
| 9 | MnAPO-36 | THF | 70 | 0.3 | 20 hrs. |
| 10 | CoAPO-5 | THF | 20 | 4.5 | 48 hrs. |
| 11 | CoAPO-36 | THF | 20 | 0.52 | 7 days |
| 12 | CoAPO-5 | THF | 20 | 0.54 | 7 days |
| 13 | ZnAPO-37 | DME[2] | 20 | 0.25 | 7 days |
| 14 | CoAPO-34 | DME | reflux | 0.6 | 7 days |
| 15 | CoAPO-36 | THF | reflux | 1.5 | 7 days |

[1]THF is tetrahydrofuran
[2]DME is dimethyoxyethane

Analyses of the products from Examples 8-15 are presented in Table 3.

TABLE 3

Analysis of Oxysulfide Molecular Sieves Prepared using HMDT

| Example # | Molecular Sieve | Wt % $MO_x$ | Wt % S Added | % of M Sulfided | Crystallinity |
|---|---|---|---|---|---|
| 8 | MnAPO-5 | 5.82 | 0.12 | 6 | same |
| 9 | MnAPO-36 | 6.24 | 0.27 | 11 | same |
| 10 | CoAPO-5 | 4.70 | 0.09 | 5 | same |
| 11 | CoAPO-36 | 4.54 | 0.15 | 8 | same |
| 12 | CoAPO-5 | 4.33 | 0.18 | 10 | same |
| 13 | ZnAPO-37 | 7.0 | 0.7 | 24 | same |
| 14 | CoAPO-34 | 9.9 | 0.46 | 4 | same |
| 15 | CoAPO-36 | 4.2 | 0.11 | 5 | same |

EXAMPLE 16

Samples of the molecular sieves (sulfided and unsulfided) from Examples 3, 6, 11, 12, 14 and 15 were tested for n-butane cracking using the following procedure. A sample (up to 5 grams) of the molecular sieve was placed in a ½" O.D. quartz tube reactor. The sample was activated in situ for 60 minutes at 500° C. under 200 $cm^3$/min dry helium purge. Then a gas mixture containing two (2) mole percent n-butane in helium at a flow rate of 50 $cm^3$/min was flowed over the sample for 40 minutes with product stream analysis being carried out at 10 minute intervals. The product distribution obtained using the various molecular sieve samples is presented in Table 4.

TABLE 4

Product Distribution from n-Butane Cracking for Sulfided and Unsulfided Compositions

| I.D.# (Example #) | Sulfided | Total Conversion (%) | Product Distribution (%) | | | | |
|---|---|---|---|---|---|---|---|
| | | | Methane | Ethane | Ethylene | Propane | Propylene |
| 11 | NO | 1.4 | 47.8 | 12.4 | 14.8 | — | 25.0 |
| 11 | YES | 6.0 | 55.8 | 2.1 | 32.3 | 1.2 | 7.2 |
| 13 | NO | 8.3 | 47.7 | 6.1 | 13.3 | 1.6 | 25.0 |
| 13 | YES | 5.4 | 75.3 | 2.7 | 6.5 | 0.4 | 11.9 |
| 14 | NO | 17.2 | 24.5 | 8.6 | 25.5 | 13.9 | 27.5 |
| 14 | YES | 13.3 | 34.7 | 25.5 | 24.9 | 5.7 | 26.9 |
| 15 | NO | 7.2 | 25.7 | 15.8 | 21.9 | 7.5 | 23.1 |
| 15 | YES | 7.7 | 36.6 | 17.7 | 17.2 | 5.3 | 19.1 |

We claim as our invention:

1. A crystalline oxysulfide composition having a threedimensional microporous framework structure of at least $MS_2$, $MO_2$, and MOS tetrahedral units, having an intracrystalline pore system and an empirical formula expressed in molar ratios:

$(M_sAl_tP_uSi_v)S_wO_{2-w}$ where M is at least one metal selected from the group consisting of metals which: 1) can be incorporated into the framework structure of a microporous molecular sieve and 2) form hydrolytically stable sulfides; s is the mole fraction of M and varies from greater than zero to about 1, t is the mole fraction of Al and varies from 0 to less than 0.5, u is the mole fraction of P and varies from 0 to about 0.5, v is the mole fraction of Si and varies from 0 to less than 0.5, w is the mole fraction of S and varies from greater than zero to about 2s and t, u and v are chosen such that when t is greater than zero, u is greater than zero, $s+t+u+v=1$ and when $s=1$, M is only a combination of gallium and germanium.

2. The composition of claim 1 where M is selected from the group consisting of cobalt, tin, zinc, iron, chromium, manganese, germanium, gallium and arsenic.

3. The composition of claim 2 where M is cobalt.

4. The composition of claim 2 where M is zinc.

5. The composition of claim 2 where M is tin.

6. A process for preparing a crystalline oxysulfide composition having a three-dimensional microporous framework structure of at least $MS_2$, $MO_2$, and MOS tetrahedral units, having an intracrystalline pore system and an empirical formula expressed in molar ratios:

$(M_sAl_tP_uSi_v)S_wO_{2-w}$ where M is at least one metal selected from the group consisting of metals which: 1) can be incorporated into the framework structure of a microporous molecular sieve and 2) form hydrolytically stable sulfides; s is the mole fraction of M and varies from greater than zero to about 1, t is the mole fraction of Al and varies from 0 to less than 0.5, u is the mole fraction of P and varies from 0 to about 0.5, v is the mole fraction of Si and varies from 0 to less than 0.5, w is the mole fraction of S and varies from greater than zero to about 2s and t, u and v are chosen such that when t is greater than zero u is greater than zero, $s+t+u+v=1$ and when $s=1$, M is only a combination of gallium and germanium, the process comprising contacting a molecular sieve having an empirical formula:

$(M_sAl_tP_uSi_v)O_2$ where s, t, u and v are as defined above with a sulfur containing compound at a temperature and for a time sufficient to exchange a portion of the oxygen on the $MO_2$ units of the framework structure with sulfur, thereby forming $MS_2$ and MOS framework units and providing a crystalline composition having the empirical formula:

$(M_sAl_tP_uSi_v)S_wO_{2-w}$

7. The process of claim 6 where the sulfur containing compound is selected from the group consisting of hexamethyldisilthiane, carbonyl sulfide and hydrogen sulfide.

8. The process of claim 7 where the sulfur containing compound is hexamethyldisilthiane.

9. The process of claim 7 where the sulfur containing compound is carbonyl sulfide.

10. The process of claim 6 where M is selected from the group consisting of cobalt, tin, zinc, iron, chromium, manganese, gallium, germanium and arsenic.

11. The process of claim 10 where M is cobalt.

12. The process of claim 10 where M is zinc.

13. The process of claim 10 where M is tin.

* * * * *